US011909115B2

(12) United States Patent
Chan et al.

(10) Patent No.: US 11,909,115 B2
(45) Date of Patent: Feb. 20, 2024

(54) 3-D FOCUS-STEERING LENS ANTENNA

(71) Applicant: City University of Hong Kong, Hong Kong (HK)

(72) Inventors: Chi Hou Chan, Hong Kong (HK); Ka Fai Chan, Hong Kong (HK); Gengbo Wu, Shantou (CN)

(73) Assignee: City University of Hong Kong, Hong Kong (HK)

( * ) Notice: Subject to any disclaimer, the term of this patent is extended or adjusted under 35 U.S.C. 154(b) by 438 days.

(21) Appl. No.: 17/338,699

(22) Filed: Jun. 4, 2021

(65) Prior Publication Data

US 2021/0384638 A1 Dec. 9, 2021

Related U.S. Application Data

(60) Provisional application No. 63/034,534, filed on Jun. 4, 2020.

(51) Int. Cl.
*H01Q 19/06* (2006.01)
*H01Q 3/14* (2006.01)
*H01Q 13/02* (2006.01)

(52) U.S. Cl.
CPC ............. *H01Q 19/062* (2013.01); *H01Q 3/14* (2013.01); *H01Q 13/02* (2013.01)

(58) Field of Classification Search
CPC ......... H01Q 19/062; H01Q 3/14; H01Q 13/02
USPC .......................................................... 342/371
See application file for complete search history.

(56) References Cited

U.S. PATENT DOCUMENTS

| | | | |
|---|---|---|---|
| 6,549,700 | B1 | 4/2003 | Sweatt et al. |
| 7,898,712 | B2 | 3/2011 | Adams et al. |
| 9,140,901 | B2 | 9/2015 | Staver |
| 9,577,327 | B2 | 2/2017 | Driscoll et al. |
| 2004/0057656 | A1 | 3/2004 | Chu et al. |

(Continued)

FOREIGN PATENT DOCUMENTS

| | | | |
|---|---|---|---|
| CN | 102798901 A | 11/2012 | |
| WO | WO-2011100070 A1 * | 8/2011 | ............. B82Y 20/00 |

(Continued)

OTHER PUBLICATIONS

Tonouchi, M., "Cutting-edge terahertz technology", Nature Photonics, vol. 1, p. 97-105, Feb. 2007.

(Continued)

*Primary Examiner* — Harry K Liu
(74) *Attorney, Agent, or Firm* — Idea Intellectual Limited; Margaret A. Burke; Sam T. Yip

(57) ABSTRACT

The present invention relates to a novel lens antenna with a 3D near-field focus-steering capability that operates at gigahertz and terahertz frequencies. The novel antenna includes a pair of discrete dielectric lenses fed by a stationary horn source. In-plane synchronous counter-rotation and co-rotation of the lens pair steers its near-field focus radially and azimuthally, respectively, while linear translation of the upper lens moves the focal point longitudinally. The steering focus beam enables fast imaging. In imaging applications, the radiated beam from the novel lens antenna focused in the target area can reduce undesired interference from neighboring structures and increase the system dynamic range and signal-to-noise ratio.

19 Claims, 19 Drawing Sheets

(56) References Cited

U.S. PATENT DOCUMENTS

| | | | | |
|---|---|---|---|---|
| 2021/0140755 A1* | 5/2021 | Zheludev | G02B 27/58 |
| 2021/0373244 A1* | 12/2021 | Saito | G02B 1/04 |
| 2021/0384638 A1* | 12/2021 | Chan | H01Q 19/062 |
| 2023/0292016 A1* | 9/2023 | Zhu | H04N 23/957 348/207.99 |

FOREIGN PATENT DOCUMENTS

| | | | | |
|---|---|---|---|---|
| WO | 2014129896 A1 | 8/2014 | | |
| WO | WO-2017053309 A1 * | 3/2017 | | B82Y 20/00 |

OTHER PUBLICATIONS

Ho, L., Pepper, M., & Taday, P., "Terahertz spectroscopy: Signatures and fingerprints", Nature Photonics, vol. 2, p. 541-543, Sep. 2008.
Koenig, S. et al., "Wireless sub-THz communication system with high data rate", Nature Photonics, vol. 7, p. 977-981, Dec. 2013.
Hosako, I. et al., "At the dawn of a new era in terahertz technology", Proceedings of the IEEE, vol. 95, No. 8, p. 1611-1623, Aug. 2007.
Baker, C. et al., "Detection of concealed explosives at a distance using terahertz technology" Proceedings of the IEEE, vol. 95, No. 8, p. 1559-1565, Aug. 2007.
Song, H. J., & Nagatsuma, T., "Present and future of terahertz communications", IEEE Transaction on Terahertz Science and Technology, vol. 1, No. 1, p. 256-263, Sep. 2011.
Cooper, K. B. et al., "Penetrating 3-D imaging at 4-and 25-m range using a submillimeter-wave radar", IEEE Transaction on Microwave Theory and Techniques, vol. 56, No. 12, p. 2771-2778, Dec. 2008.
Llombart, N. et al., "Terahertz antenna system for a near-video-rate radar imager", IEEE Antennas and Propagation Magazine, vol. 52, No. 5, p. 251-259, Oct. 2010.
Ok, G. et al., "High-speed terahertz imaging toward food quality inspection", Applied Optics, vol. 53, No. 7, p. 1406-1412, Mar. 1, 2014.
Ok, G. et al., "High-performance sub-terahertz transmission imaging system for food inspection", Biomedical Optics Express, vol. 6, No. 5, p. 1929-1941, Apr. 29, 2015.
Katletz, S. et al., "Efficient terahertz en-face imaging", Optics Express, vol. 19, No. 23, p. 23042-23053, Oct. 28, 2011.
Llombart, N. et al., "Confocal ellipsoidal reflector system for a mechanically scanned active terahertz imager", IEEE Transactions on Antennas Propagation, vol. 58, No. 6, p. 1834-1841, Jun. 2010.
Cooper, K. B. et al.," THz imaging radar for standoff personnel screening", IEEE Transaction on Terahertz Science and Technology, vol. 1, No. 1, p. 169-182, Sep. 2011.
Yu, N. et al., "Light propagation with phase discontinuities: generalized laws of reflection and refraction", Science vol. 334, p. 333-337, Oct. 21, 2011.
A. V. Kildishev et al., "Planar photonics with metasurfaces", Science vol. 339, 1232009, Mar. 15, 2013.
Nanfang Yu and Federico Capasso, "Flat optics with designer metasurfaces", Nature Materials, vol. 13, p. 139-150, Feb. 2014.
P. Genevet, et al., "Recent advances in planar optics: From plasmonic to dielectric metasurfaces", Optica, vol. 4, No. 1 , p. 139-152, Jan. 2017.
F. Falcone et al., "Babinet principle applied to the design of metasurfaces and metamaterials", Physical Review Letters, vol. 93, No. 197401, Dec. 2004.
Xingjie Ni et al., "Metasurface holograms for visible light", Nature Communication, 4, 2807, 2013.
Guoxing Zheng et al., "Metasurface holograms reaching 80% efficiency", Nature Nanotechnology, vol. 10, p. 308-312, 2015.
Mikhail I. Shalaev et al., "High-efficiency all-dielectric metasurfaces for ultracompact beam manipulation in transmission mode", Nano Letters 15, p. 6261-6266, 2015.
Philippe Lalanne et al.,"Blazed binary subwavelength gratings with efficiencies larger than those of conventional échelette gratings", Optics Letters, vol. 23, No. 14, p. 1081-1083, Jul. 15, 1998.
Simion Astilean et al., "High-efficiency subwavelength diffractive element patterned in a high-refractive-index material for 633 nm", Optics Letters, vol. 23, No. 7, p. 552-554, Apr. 1, 1998.
Amir Arbabi et al.,"Dielectric metasurfaces for complete control of phase and polarization with subwavelength spatial resolution and high transmission", Nature NanoTechnology. vol. 10, p. 937-944, 2015.
Khorasaninejad, M. et al. Metalenses at visible wavelengths: Diffraction-limited focusing and subwavelength resolution imaging. Science 352, p. 1190-1194 (2016).
Khorasaninejad, M., & Capasso, F. Metalenses: Versatile multifunctional photonic components. Science 358, eaam8100 (2017).
Arbabi, A., Horie, Y., Ball, A. J., Bagheri, M., & Faraon, A. Subwavelength-thick lenses with high numerical apertures and large efficiency based on high-contrast transmitarrays. Nat. Commun. 6, 7069 (2015).
Khorasaninejad M. et al., Polarization-insensitive metalenses at visible wavelengths. Nano Lett. 16, p. 7229-7234 (2016).
Ee, H. S., & Agarwal, R. Tunable metasurface and flat optical zoom lens on a stretchable substrate. Nano Lett. 16, p. 2818-2823 (2016).
Kamali, S. M., Arbabi, E., Arbabi, A., Horie, Y., & Faraon, A. Highly tunable elastic dielectric metasurface lenses. Laser Photon. Rev. 10, p. 1002-1008 (2016).
Zhan, A., Colburn, S., Dodson, C. M., & Majumdar, A. Metasurface freeform nanophotonics. Sci. Rep. 7, 1673 (2017).
Colburn, S., Zhan, A., & Majumdar, A. Varifocal zoom imaging with large area focal length adjustable metalenses. Optica 5, p. 825-831 (2018).
Arbabi, E., Arbabi, A., Kamali, S. M., Horie, Y., Faraji-Dana, M., & Faraon, A. MEMS-tunable dielectric metasurface lens. Nat. Commun. 9, 812 (2018).
Griffiths, H. D., & Khan, M. R. Antenna beam steering technique using dielectric wedges. IEE Proc. H-Microw. Antennas Propaga. 136, p. 126-131 (1989).
Garcia-Torales, G., Strojnik, M., & Paez, G. Risley prisms to control wave-front tilt and displacement in a vectorial shearing interferometer App. Opt. 41, p. 1380-1384 (2002).
Yi, H., Qu, S. W., Ng, K. B., Chan, C. H., & Bai, X. 3-D printed millimeter-wave and terahertz lenses with fixed and frequency scanned beam. IEEE Trans. Antennas Propag. 64, p. 442-449 (2015).
Wu, G. B., Zeng, Y. S., Chan, K. F., Qu, S. W., & Chan, C. H. High-gain circularly polarized lens antenna for terahertz applications. IEEE Antennas Wirel. Propag. Lett. 18, p. 921-925 (2019).
Wu, G. B., Zeng, Y. S., Chan, K. F., Qu, S. W., & Chan, C. H. 3-D printed circularly polarized modified Fresnel lens operating at terahertz frequencies. IEEE Trans. Antennas Propag. 67, p. 4429-4437 (2019).
Ng, K. B., & Chan, C. H. On the dielectric properties of substrates with different surface conditions for submillimeter-wave and terahertz applications. Int. J. THz Sci. Technol. 9, p. 45-59 (2016).
Li, P. F., Qu, S. W., Yang, S., & Nie, Z. P. Microstrip array antenna with 2-D steerable focus in near-field region. IEEE Trans. Antennas Propag. 65, p. 4607-4617 (2017).
Wei, H., Amrithanath, A. K., & Krishnaswamy, S. 3D printing of micro-optic spiral phase plates for the generation of optical vortex beams, IEEE Photon. Technol. Lett. 31, p. 599-602 (2019).
Wang, H. et al. Off-axis holography with uniform illumination via 3D printed diffractive optical elements. Adv. Opt. Mater. 1900068 (2019).
Khorasaninejad, M., & Crozier, K. B. Silicon nanofin grating as a miniature chirality-distinguishing beam-splitter. Nat. Commun. 5, 5386 (2014).
Lin, D., Fan, P., Hasman, E., & Brongersma, M. L. Dielectric gradient metasurface optical elements. Science 345, p. 298-302 (2014).
Rogers, E. T. et al. A super-oscillatory lens optical microscope for subwavelength imaging. Nat. Mater. 11, p. 432-435 (2012).
Chen, W. T. et al. High-efficiency broadband meta-hologram with polarization-controlled dual images. Nano Lett. 14, p. 225-230 (2013).

* cited by examiner

3-D FOCUS-STEERING LENS ANTENNA

CROSS-REFERENCE TO RELATED APPLICATIONS

This application claims priority from the U.S. provisional patent application Ser. No. 63/034,534 filed Jun. 4, 2020, and the disclosure of which is incorporated herein by reference in its entirety.

FIELD OF THE INVENTION

The present invention generally relates to focusing antennas generally and, more particularly, to three-dimensional focus-steering lens antennas that may be used in gigahertz and terahertz systems.

BACKGROUND OF THE INVENTION

Terahertz radiation, that is, electromagnetic waves in a band from approximately 0.3 to 3 terahertz, has recently emerged as a promising electromagnetic spectral region for various imaging and other applications. Due to features such as wide bandwidth, non-ionizing properties, and penetration capabilities, terahertz radiation-based devices open up new possibilities for non-destructive detection, material characterization, and high-resolution imaging. Focus-steering devices are essential for these terahertz applications for fast detection tracking, and imaging. The first generation of terahertz imaging systems have largely adopted mechanical apparatuses to move the entire system to manipulate the focus with intrinsic limits in weight, integration and imaging time.

The second generation systems, generally based on bulky f-theta refractive lenses or Gregorian reflectors, allow focus steering by moving some components of the systems. Specifically, wave incident angles can be tuned by mechanically tilting a minor placed in front of an f-theta refractive lens or reflector, thereby adjusting the focal position. The use of conventional bulky refractive/reflective components makes these systems unwieldy, slow, and with limited field of view, for example, 1.1°×1.1°. The realization of fast, compact, lightweight, and high-repeatability focus-steering devices is one of the most important open challenges in terahertz science.

Thus, there is a need in the art for focus-steering devices. Such devices could be used in terahertz systems for applications such as imaging and tracking.

SUMMARY OF THE INVENTION

The present invention relates to a novel lens antenna with a 3D near-field focus-steering capability that operates at gigahertz and terahertz frequencies. The novel antenna includes a pair of discrete dielectric lenses fed by a stationary horn source. In-plane synchronous counter-rotation and co-rotation of the lens pair steers its near-field focus radially and azimuthally, respectively, while linear translation of the upper lens moves the focal point longitudinally. The steering focus beam enables fast imaging. In imaging applications, a radiated beam focused in the target area can reduce undesired interference from neighboring structures and increase the system dynamic range and signal-to-noise ratio.

In one aspect, the invention includes first and second rotatable discrete dielectric metalenses, each metalens including arrays of subwavelength dielectric projections, the discrete dielectric metalenses being counter-rotatable and co-rotatable to change a radial and azimuthal focal position, respectively, with the first and second discrete dielectric metalenses being arranged along a z-axis. A feed source emits radiation which is incident on the first discrete dielectric metalens. A z-axis translator changes the relative interlens position of the first and second discrete dielectric metalenses to move a position of a focused beam along the z-axis. The position of the focused beam is scannable within a three-dimensional cylindrical space.

DETAILED DESCRIPTION

The present invention relates to a novel lens antenna with a 3D near-field focus-steering capability operating at gigahertz and terahertz frequencies. In imaging applications, a radiated beam focused in a target area can reduce undesired interference from neighboring structures and increase the system dynamic range and signal-to-noise ratio. A steering focus beam enables fast imaging. The novel antenna includes at least two discrete dielectric lenses fed by a stationary horn source. In-plane synchronous counter-rotation and co-rotation of the lens pair steers its near-field focus radially and azimuthally, respectively, while linear translation between the upper and lower lens moves the focal point longitudinally. One implementation of the invention is based on thin discrete dielectric lenses, making the system more compact, lightweight, and able to be integrated with gigahertz and terahertz sources with improved system performance compared to conventional refractive lens-based devices. In one implementation, the lens antenna of the present invention can realize 3D near-field focusing with a large field of view of 80°×80°.

In one aspect, the dielectric lenses of the present invention use metasurfaces; the resultant structure is termed "metalens." Metasurfaces, governed by the generalized Snell's laws of reflection and refraction, are arrays of subwavelength phase-gradient scatterers imposing phase discontinuities at the interface of two media to control light wavefronts. Metalenses are capable of focusing light in a planar form. As used herein, the term "metalens" relates to an engineered three-dimensional material lens with arrays of subwavelength elements.

Figure 1A:
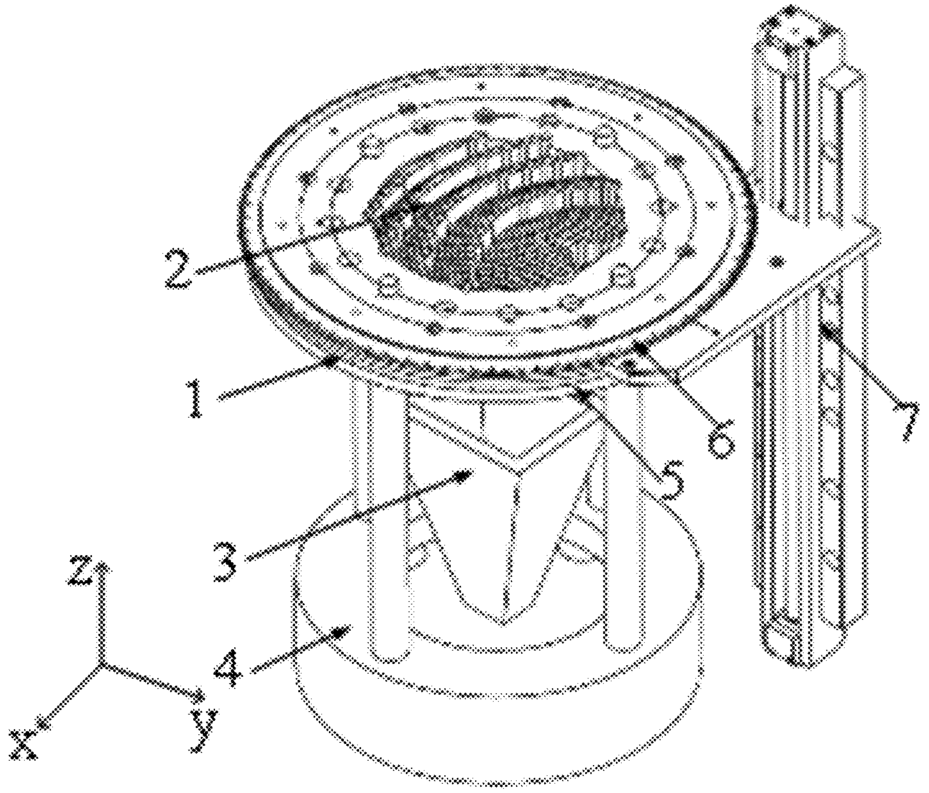
FIGS. 1(*a*)-1(*b*) depict perspective and side views, respectively of an antenna according to an embodiment.
Figure 1B:
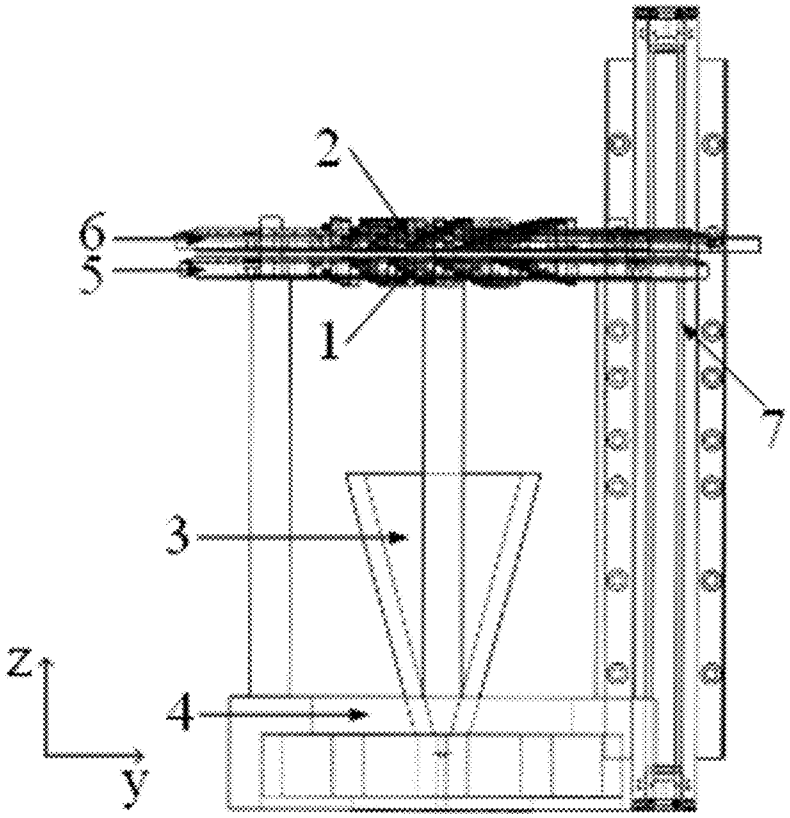

Turning to the drawings in detail, FIGS. 1(*a*)-1(*b*) depict the novel lens antenna with a 3D near-field focus-steering capability operating at terahertz frequencies according to an embodiment. The 3D focus-steering antenna includes a first discrete dielectric lens (DDL) 1, a second discrete dielectric lens 2 (DDL 2) and a feed horn 3. The feed horn 3 is connected to a metallic waveguide to assure the compatibility of the focus-steering antenna and the standard terahertz components since some existing terahertz systems are waveguide-based. Both of the two lenses can be in-plane rotated along their centrosymmetric axes independently and the upper lens 2 can also move along the z-direction.

An antenna fixture 4 with four vertical posts is used to support and assemble the lens pair and the feed horn. The in-plane rotation mechanism is similar to that used for Risley prisms. But different from Risley prisms, which are used for far-field beam scanning, the present invention is applied to near-field focus steering applications. An example of rotation stages is depicted in FIGS. 1(*a*)-1(*b*). A rotation stage for the lower DDL (DDL 1) is shown as stage 5 while a rotation stage for the upper DDL (DDL 2) is shown as stage 6. A translation stage 7 provides separation between DDL 1 and DDL 2 through movement of DDL 2 in the z direction. Typically, independent drive motors are used to rotate the lenses while an additional motor changes the spacing along the z-axis between the lenses. For example, rotation and translation can be performed using commercially available rotation and translation stages, such as STANDA Rotator 8MRB240 and STANDA Motorized Delay Line 8MT160-300. However, it is understood that any mechanism may be used for translation and rotation of the lenses.

Figure 3A:
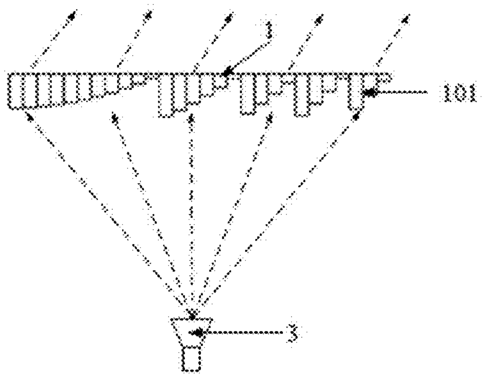
FIGS. 3(*a*) and 3(*b*) schematically depict the configuration of dielectric elements on the upper and lower lenses.
Figure 3B:
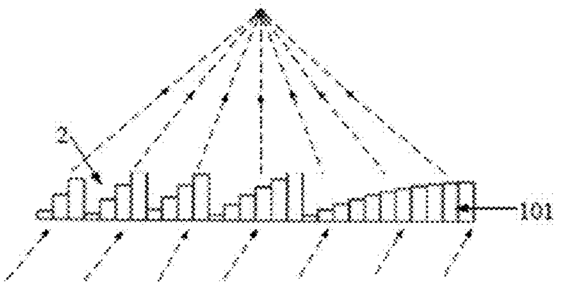

The first DDL 1 transforms a spherical phase front from the phase center of the feed source into a tilted plane wave phase front above the DDL 1 aperture as shown in FIG. 3(*a*).

Figure 2:
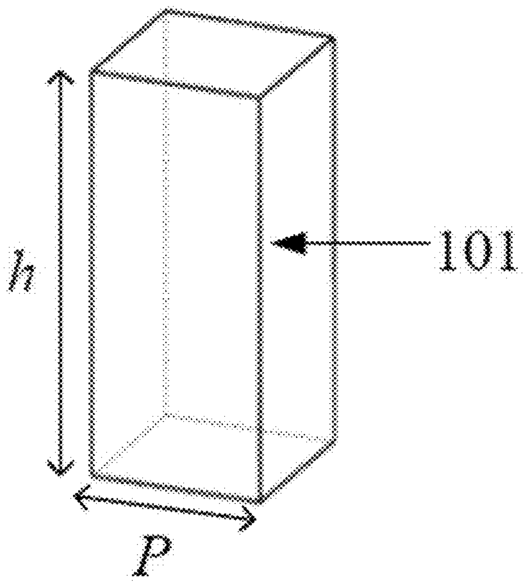
FIG. 2 depicts the configuration of a dielectric post element.
Figure 4A:
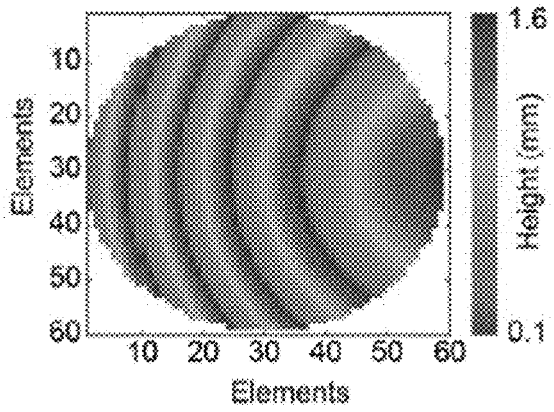
FIGS. 4(*a*) and 4(*b*) depict height distributions for dielectric post elements on the lower and upper lenses.
Figure 4B:
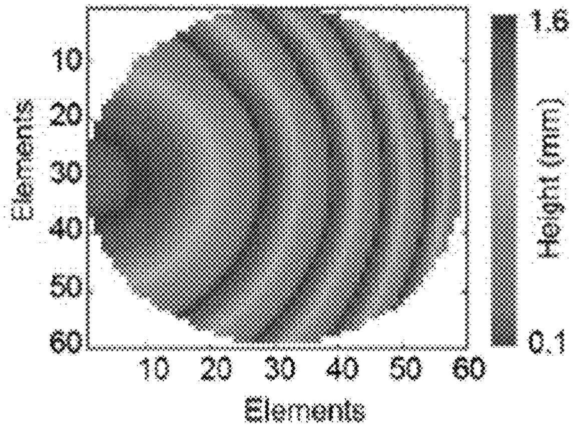

The DDL includes of array of subwavelength-sized dielectric projections/elements that, in one embodiment, may be posts with different heights (or lengths). An example of an individual dielectric projection is shown in FIG. 2. FIG. 2 shows a post in the shape of a parallelepiped having a height h and a side length/lattice size P. In one embodiment, P=0.25 mm ($0.25\lambda_o$, where $\lambda_o$, is the free-space wavelength at 300 GHz). A full transmission phase range over 360° can be achieved as h is varied from 0.1 to 1.6 mm Note that the dimensions change for different selected wavelengths that are emitted by feed horn 3. The height of the dielectric post h for each element is different from pixel to pixel to compensate for the required transmission phase for the two DDLs. In one example, the diameter of DDL 1 is 15 mm and the distance between the phase center of the feed horn 3 and DDL 1 is set to approximately 24 mm to provide a proper illumination taper on the aperture of the lens. The height distribution of the dielectric posts for DDL 1 is shown in FIG. 4(*a*). The dielectric projections may include multiple subarrays, each of the sub-arrays including multiple dielectric projections of generally decreasing lengths.

The dielectric lenses may be fabricated by 3D printing using a high temperature resin with a relative dielectric constant $\varepsilon r=2.66$ and loss tangent $\tan\delta=0.03$ at 300 GHz. In one aspect, a computer model, such as a CAD drawing, is made for each lens based on the number of dielectric projections, the projection heights, inter-projection spacing, etc. The CAD drawing is converted to 3D printer instructions using any commercially-available software program for CAD drawing conversion. Using the printer instructions, a 3D printer is used to deposit the lens base and the dielectric projections by building up individual layers until the final projection height is reached. Any commercially-available additive manufacturing platform may be used to fabricate DDL 1 and DDL 2.

The upper lens 2 is parallel to the physical aperture of the lower lens 1 and its schematic side cross-sectional view is depicted in FIG. 3(*b*). DDL 2 has a focal length of 20 mm and a diameter of 15 mm for the selected wavelength of 300 GHz. To concentrate the incident waves into the focal point, DDL 2 should firstly compensate for the incident progressive phase distribution from the lower lens 1 and provide a quadratic phase distribution above the lens 2 aperture. Hence, the desired aperture phase distribution of lens 2 is the sum of progressive phase distribution and quadratic phase distribution. Further details showing the operation of the lenses is set forth in the Examples below.

A multi-focus synthesis method that compensates the required transmission phases at multi-focus points can be used to reduce the aberration as the focus steers away from the center. The height-variable dielectric post 101 is also used as the building block of the upper lens 2. The height distribution of the dielectric posts for the DDL 2 is shown in FIG. 4(*b*).

Figure 5:
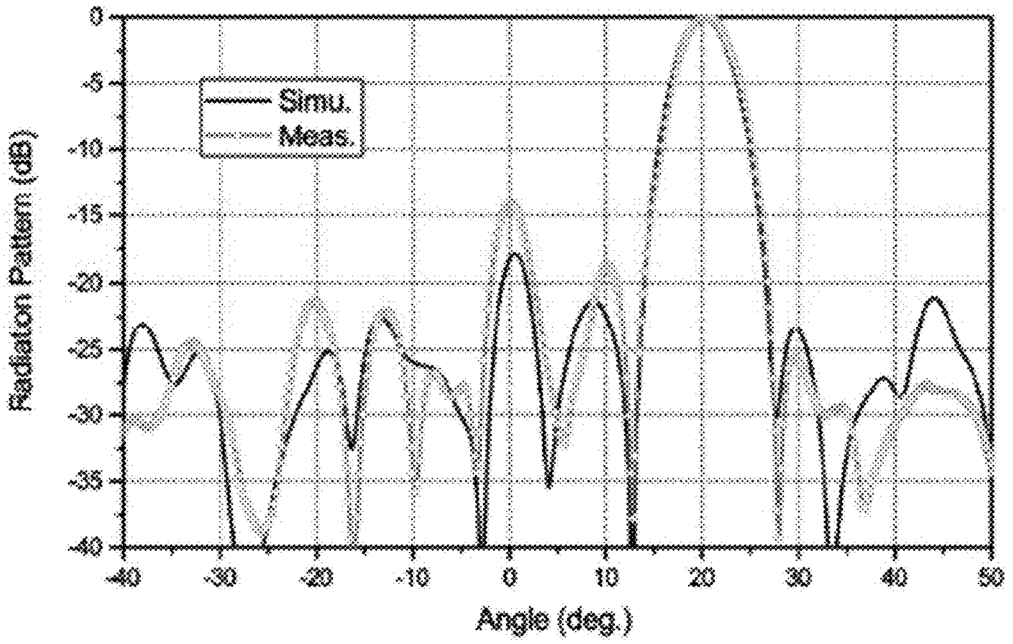
FIG. 5 depicts simulated and measured far-field radiation patterns of the lower lens at 300 GHz.

FIG. 5 shows the measured far-field radiation pattern of the lower lens 1 without the upper lens 2. It can be seen that the lower lens 1 transforms the spherical phase front from the feed horn into a tilted plane wave, corresponding to a pencil-beam in the far-field as shown in FIG. 5.

Figure 6A:
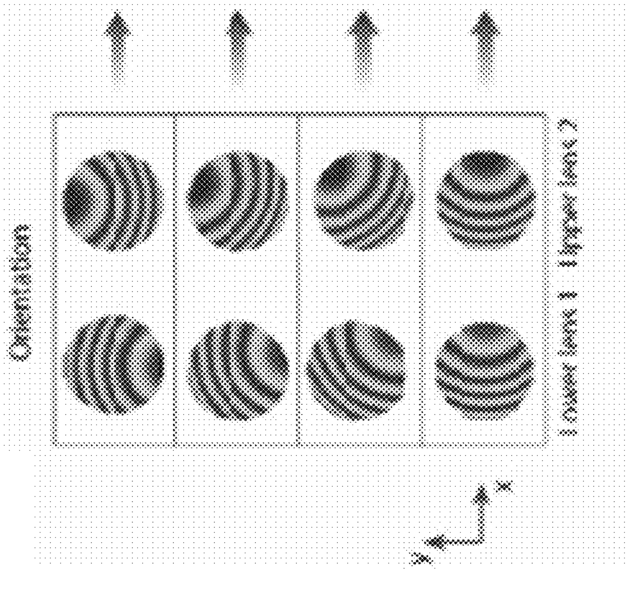
FIG. 6(*a*)-6(*c*) depicts orientations of the upper and lower lenses and their corresponding simulated and measured power densities on the focal plane for focus radial steering.
Figure 6B:
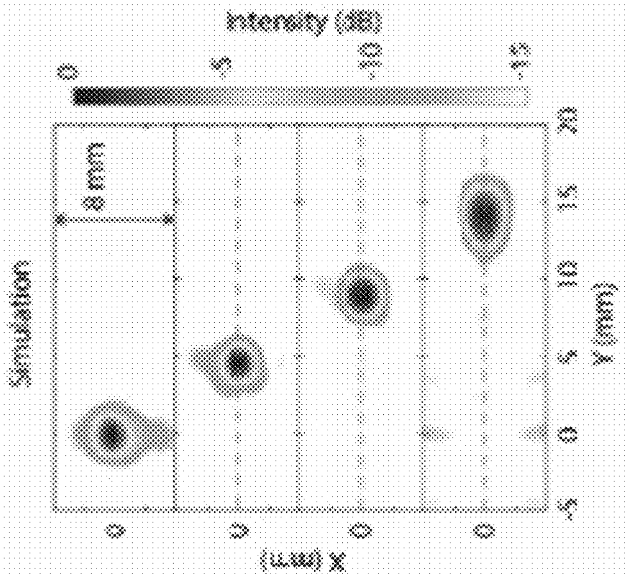
Figure 6C:
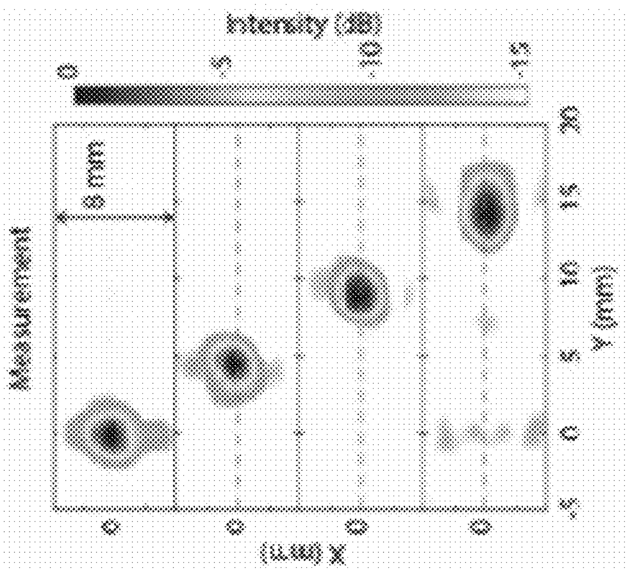

Lenses 1 and 2 are synchronously counter-rotated to steer the focus along the radial direction. FIGS. 6(*a*)-6(*c*) plot the orientations of the lens pair and their corresponding simulated and measured power densities on the focal plane at 300 GHz. The positions of the foci and their corresponding rotation angles are listed in Table I.

TABLE I

| Focal positions and rotation angles of the two lenses for focus radial steering* | | | | |
|---|---|---|---|---|
| Case | $\psi_1$ | $\psi_2$ | $\psi$ | r |
| 1 | 0° | 180° | 90° | 0 mm |
| 2 | 22.5° | 157.5° | 90° | 4.6 mm |
| 3 | 45° | 135° | 90° | 8.9 mm |
| 4 | 90° | 90° | 90° | 13.4 mm |

*$\psi_1$ and $\psi_2$ are the rotation angles of the lower lens and upper lens, respective (r, $\psi$) are the polar coordinates of the focus point.

From FIGS. 6(*a*)-6(*c*), it can be seen that a radially steerable focal radius from 0 to 13.4 mm can be achieved by synchronous counter-rotation of the lens pair. Although only four rotation angles are presented in FIG. 6, the focus can continuously steer along the radial direction by continuous, synchronous rotation of the lens pair.

Figure 7:
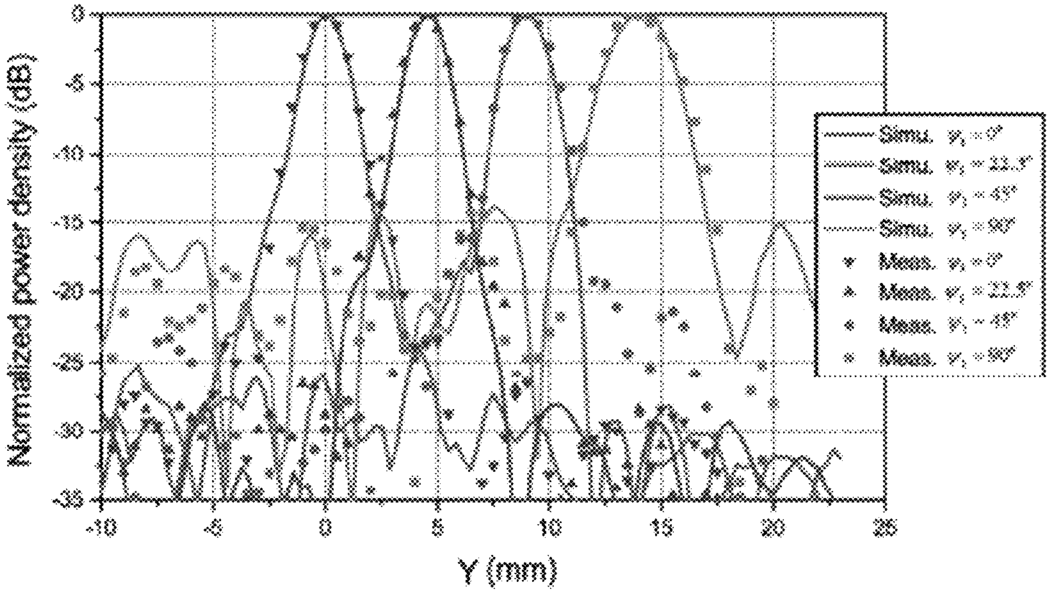
FIG. 7 depicts simulated and measured power densities along the line x=0 mm on the focal plane for focus radial steering at 300 GHz.
Figures 8A, 8B, 8C:
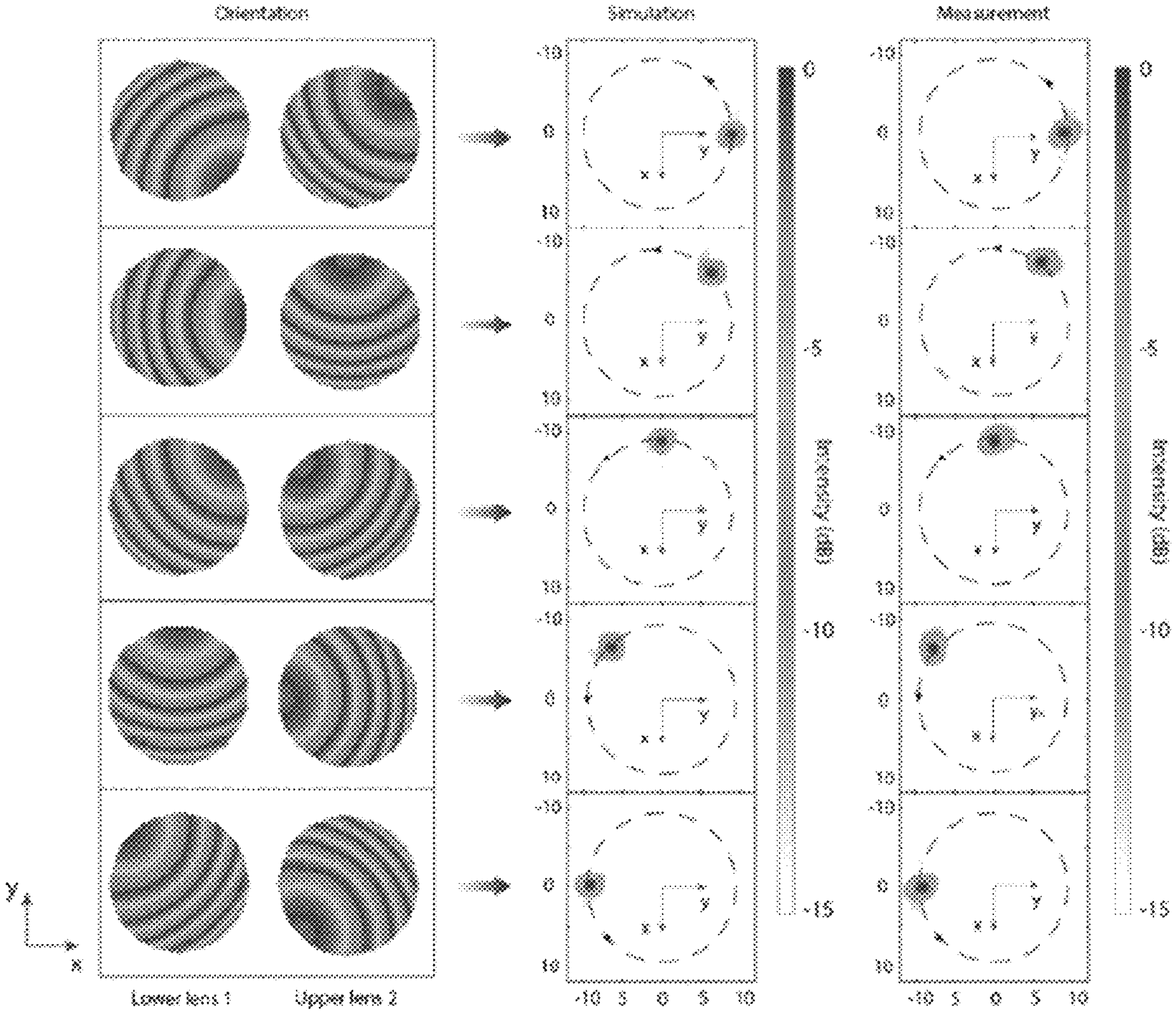
FIGS. 8(*a*)-8(*c*) depict orientations of the upper and lower lenses and their corresponding simulated and measured power densities on the focal plane for focus azimuth steering.

FIG. 7 shows the simulated power densities on the focal plane of the antenna. Within the whole focus steering range, the near-field sidelobe levels (SLLs) are all below −14 dB. The focus scan loss, defined as the discrepancy of electric field intensity at the focal point when scanning, is around 4.5 dB. Lenses 1 and 2 are synchronously co-rotated to steer the focus along the azimuthal direction. FIGS. 8(*a*)-(*c*) illustrates the orientations of the lenses 1 and 2 and their corresponding simulated and measured power densities on the focal plane at 300 GHz. The focus positions and their corresponding rotation angles are listed in Table II. The focus steering counterclockwise along a circular orbit can be observed from FIG. 8(*a*)-(*c*).

TABLE II

| Focal positions and rotation angles of the two lenses for focus azimuth steering | | | | |
|---|---|---|---|---|
| Case | $\psi_1$ | $\psi_2$ | $\psi$ | r |
| 1 | 45° | 135° | 90° | 8.9 mm |
| 2 | 90° | 180° | 135° | 8.9 mm |
| 3 | 135° | 225° | 180° | 8.9 mm |
| 4 | 180° | 270° | 225° | 8.9 mm |
| 5 | 225° | 315° | 270° | 8.9 mm |

The focus at different azimuth angles shares a similar focusing performance in terms of near-field SLL, full width at half maximum (FWHM) and power density. Although only five azimuthal steering cases are presented in FIG. 8, the antenna can realize continuous focus azimuthal steering with continuous synchronous co-rotation of the lens pair.

Figure 9:
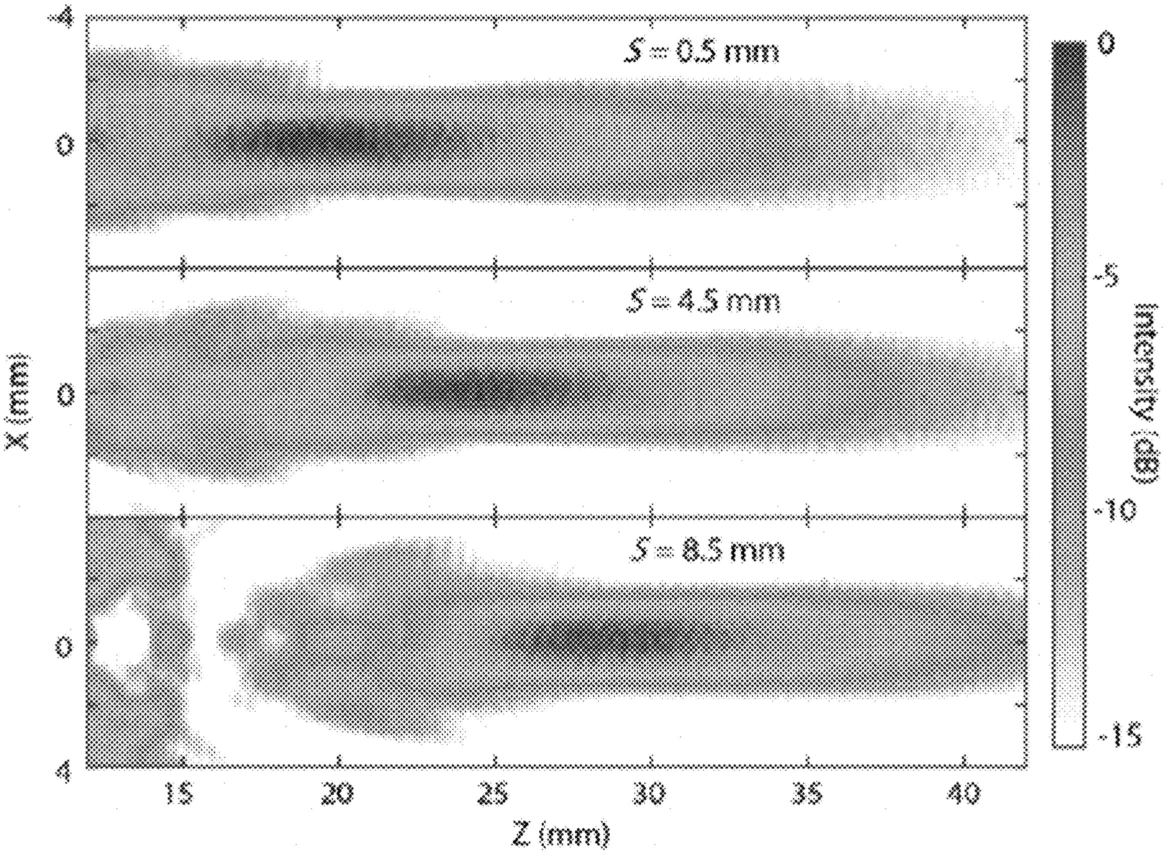
FIG. 9 depicts simulated power densities on the longitudinal plane for different separations of the two lenses for focus longitudinal steering.

Changing the separation S of the lenses 1 and 2 steers the focus along the longitudinal direction (z-direction). For focus longitudinal steering, both the feed horn 3 and the lower lens 1 are kept stationary while lens 2 is linearly translated along the z-direction although other techniques for lens separation are also possible. FIG. 9 depicts the simulated power densities on the longitudinal plane for different separations of the lens pair (S=0.5, 4.5, 8.5 mm, respectively) at 300 GHz. It can be seen that the focus is moving away from the lens aperture accordingly. A large longitudinal scan range of 8 mm ($8\lambda_0$) can be achieved in the embodiment of the present disclosure.

Figure 10A:
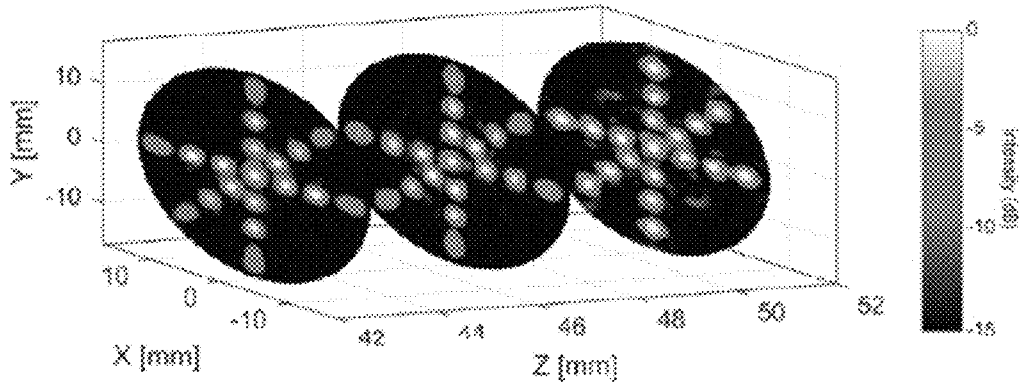
FIGS. 10(*a*)-10(*b*) depict the simulated and measured power densities on the three focal planes by combining synchronous co-rotation and counter-rotation of the upper and lower lenses and linear separation of the two lenses.
Figure 10B:
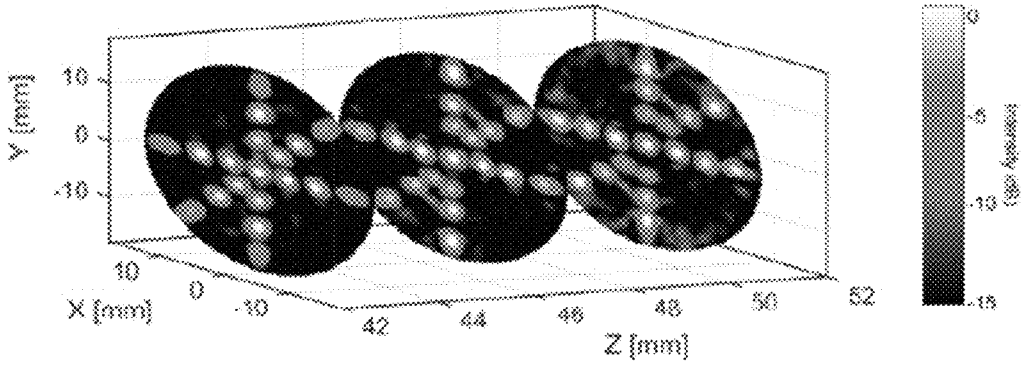

The focus of the antenna can be steered radially, azimuthally and longitudinally by synchronous counter rotation and co-rotation of the lens pair, and linear translation of the upper lens 2, respectively. Combining these three movements can realize a fully three-dimensional focus steering. FIGS. 10(*a*)-(*b*) show the simulated and measured power densities on three focal planes (S=0.5, 4.5 and 8.5 mm) at 300 GHz by combing synchronous co-rotation and counter-rotation of the lens pair and linear translation of lens 2. For each plane, the focus is steered along the lines of x-axis, diagonal, and y-axis. The results in FIGS. 10(*a*)-(*b*) are obtained by adding the simulated/measured power densities for all the focus steering cases on each focal plane. Again, although focusing scanning on only three lateral planes is shown in FIG. 10 for simplicity, the antenna can steer its focus at any position in the cylindrical 3D space with a diameter of 27 mm and length of 8 mm.

Figure 11A:
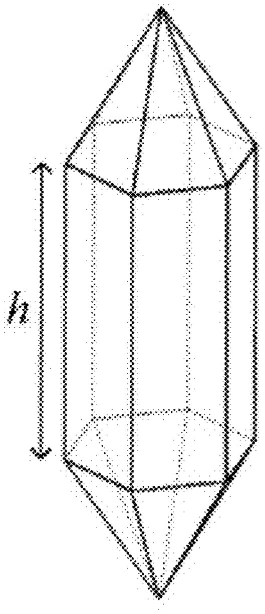
FIGS. 11(*a*)-11(*b*) depict examples of other shapes for lens dielectric elements.
Figure 11B:
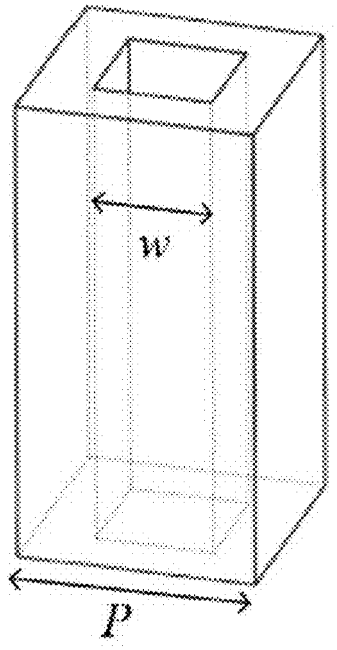

The array of elements of the two discrete dielectric lenses can have different element configurations, as shown in FIG. 11. FIG. 11(*a*) shows a hexagonal dielectric element. The top and bottom dielectric hexagonal pyramids are antireflection structures which can reduce the multi-reflection at the air-dielectric interface. The middle section is a hexagonal dielectric post whose height can be varied for each pixel to realize the required transmission phase shift. FIG. 11(*b*) shows the structure of a transverse-variable discrete dielectric element, whose width w can be tuned for each pixel to achieve the desired phase distributions of the two lenses.

Figure 12A:
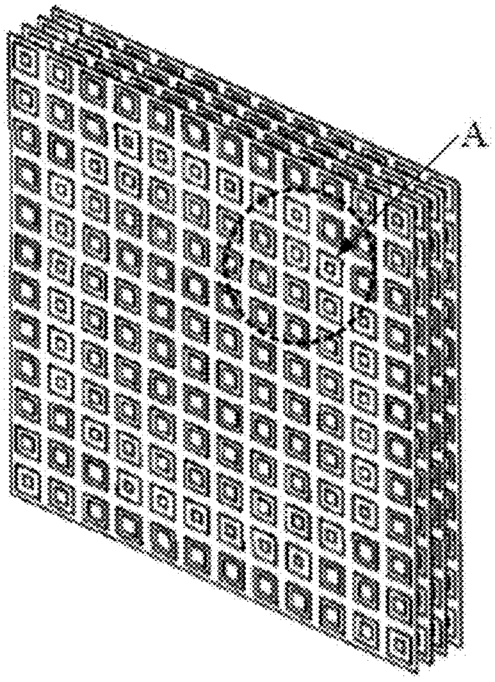
FIGS. 12(*a*)-12(*b*) depict phase-shifting structures: a four-layer transmit array with double-square-loop elements.
Figure 12B:
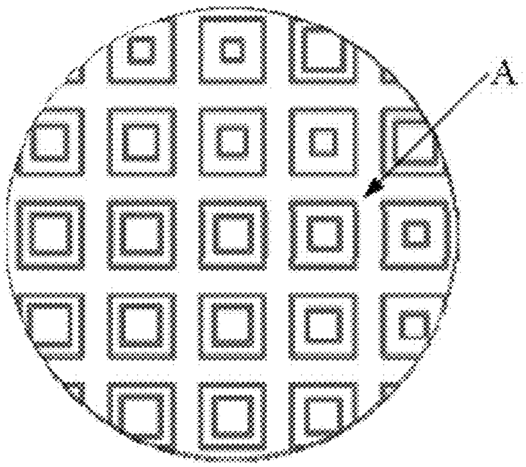

The 3D focus-steering antenna may also employ other phase-control or phase-shifting structures, such as the four-layer transmit array with double-square-loop element depicted in FIGS. 12(*a*)-(*b*).

Example 1: Metalens Design

Design of Metalens #1 (DDL 1)

Figures 13A, 13B, 13C, 13D, 13E, 13F, 13G, 13H:
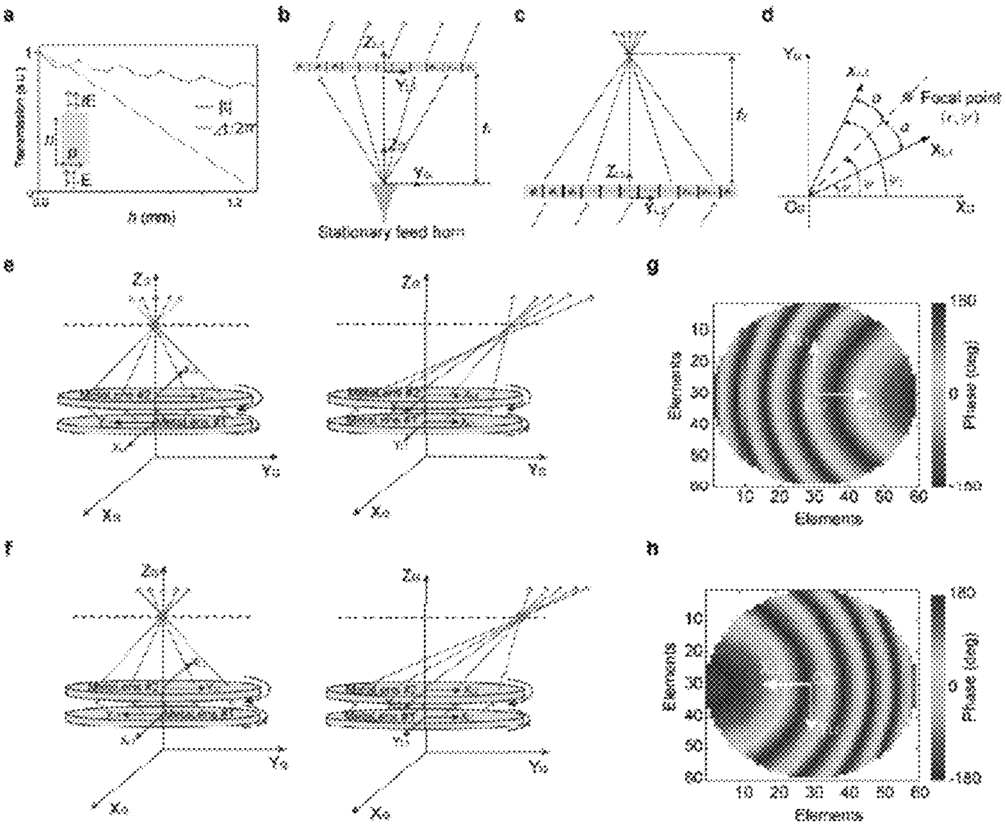
FIG. 13(*a*)-13(*h*) depicts operation of two metalenses in an antenna of the present invention.
Figure 14A:
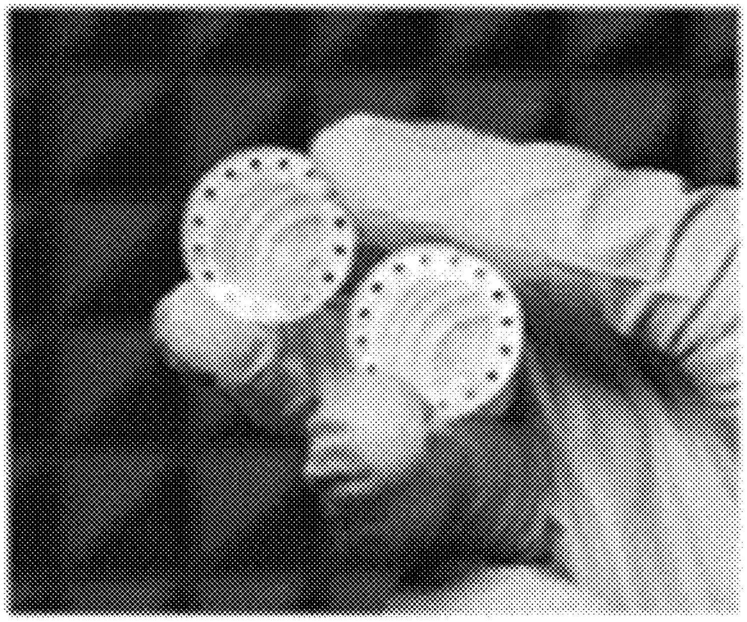
FIGS. 14(*a*)-14(*e*) show prototype fabrication and measurement.
Figure 14B:
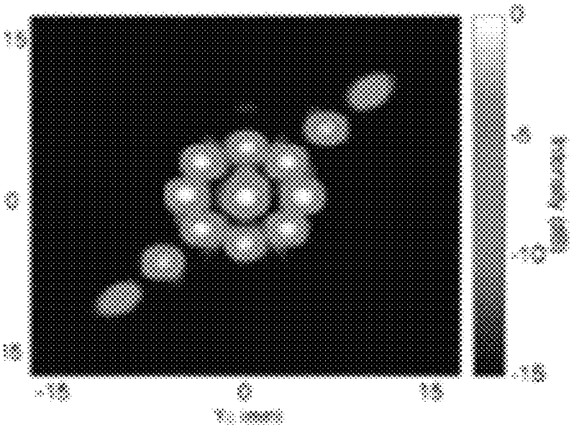
Figure 14C:
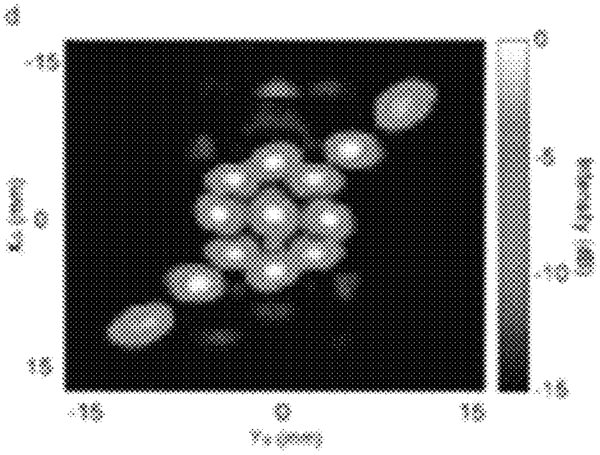
Figure 14D:
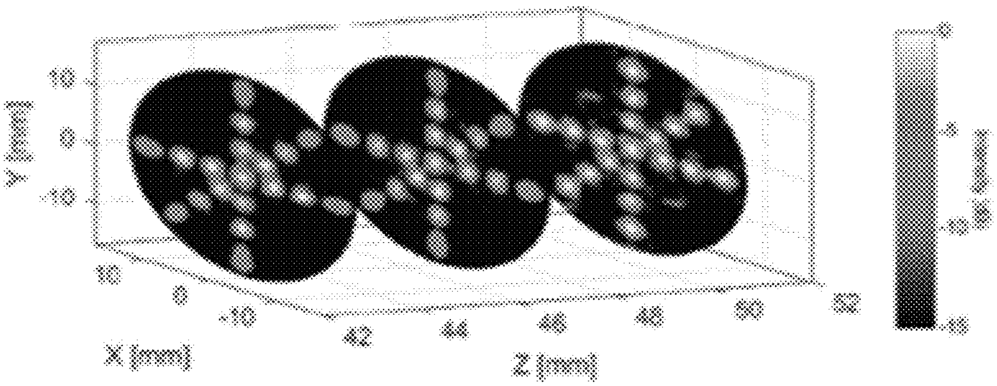
Figure 14E:
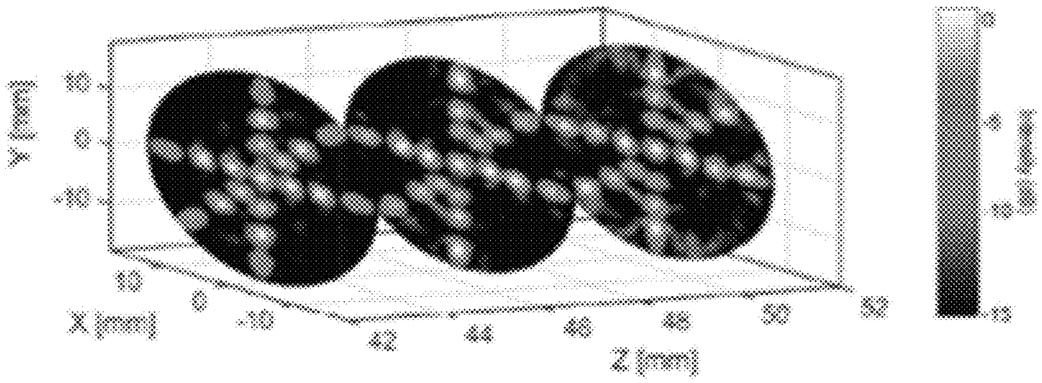

The schematic of Metalens #1 (DDL 1) and its interaction with incident radiation is depicted in FIG. 13(*b*). A linearly polarized standard pyramid horn (Millitech SGH-03) with a gain of 23 dBi at 0.3 THz is adopted as the feed. The origin of the global coordinate system $O_G$ is located at the phase center of the feed horn. The distance between the phase center of the feed horn and Metalens #1 is set as $f_1$=24 mm to provide a proper illumination taper on the aperture of the metalens. Metalens #1 is aimed at transforming the spherical phase front from the phase center of the feed source into a titled plane wave phase front above the aperture of Metalens #1 as shown in FIG. 13(*b*). The required phase retardation profile φ(x, y) of Metalens #1 is given by:

$$\varphi(x, y) = \frac{2\pi}{\lambda_0}\left[\sqrt{x^2 + y^2 + f_1^2} - \sin\theta_G(x\cos\varphi_G + y\sin\varphi_G)\right] \quad (1)$$

where (x, y) are the global coordinates of each dielectric post, and ($\theta_G$=20°, $\varphi_G$=0°) is the direction of the transmitted plane wave, where the subscript G denotes that the angle is with respect to the global coordinate system. The calculated required phase profile is shown in FIG. 13(*g*). For following clear illustration purpose, a local coordinate reference system (L1) is also defined, whose origin $O_{L1}$ is at the geometric center of Metalens #1 as denoted in FIG. 13(*g*). The direction of the phase progression of Metalens #1 is always along the $x_{L1}$-axis. When Metalens #1 is rotated, the local coordinate system L1 is synchronously co-rotated as well. In other words, local coordinate system L1 is turned by the same angle in the same direction along the $z_{L1}$-axis with Metalens #1. Note that the global coordinate G is fixed whenever the metalens doublet is rotated.

Design of Metalens #2.

Figures 17A, 17B, 17C:
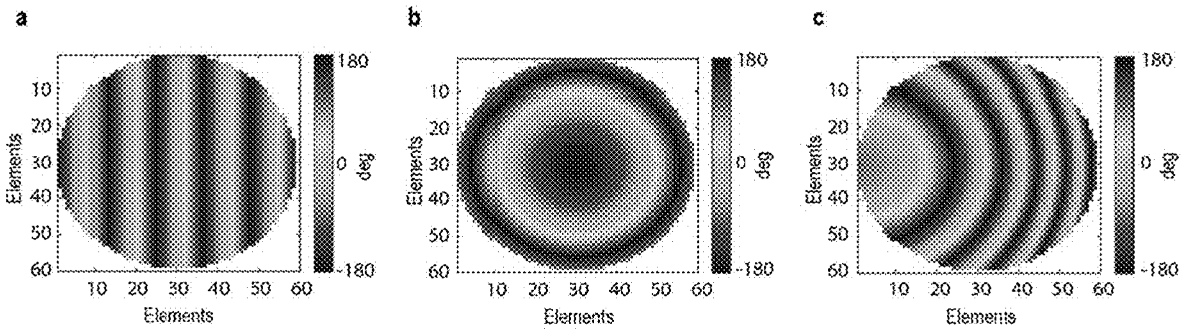
FIGS. 17(*a*)-17(*c*) depict the required aperture phase retardation for metalens #2 using a single-focus approach.

Metalens #2 is parallel to the physical aperture of Metalens #1 and its schematic is depicted in FIG. 13(*c*). Similar to Metalens #1, a local coordinate reference system (L2) is also defined, whose origin $O_{L2}$ is located at the geometric center of Metalens #2. Again, the local coordinate system L2 is synchronous co-rotation of Metalens #2. Metalens #2 has a reverse functionality of Metalens #1, i.e., focusing the incident plane waves from Metalens #1 into a specific focal point as shown in FIG. 13(*c*). Metalens #2 has an identical diameter of 15 mm to that of Metalens #1 and has a focal length of $f_2$=20 mm. To concentrate the incident waves into the focal point, Metalens #2 should firstly compensate for the incident progressive phase distribution from Metalens #1 (phase conjugation to the incident waves as shown in FIG. 17(*a*)) and provide a quadratic phase distribution above the lens aperture (see FIG. 17(*b*)). Then the desired aperture phase distribution of Metalens #2 is the sum of progressive phase distribution and quadratic phase distribution (see FIG. 17(*c*)). The metasurface designed using this method is denoted as single-focus metalens since the designed Metalens #2 can only concentrate the incident waves into its focal point at the center. When the focus steers away from the center by synchronous counter rotation of the metalens pair, large phase errors occur on the lens aperture and the transmitted waves cannot be perfectly superposed in phase at the desired position of the focal point, resulting in off-axis aberration as shown in FIG. 13(*e*).

For a clear illustration purpose, FIG. 13(*d*) shows the relationship of the three defined coordinate systems in this design. The angle between the $x_{L1}$-axis of the local coordinate system L1 (i.e., phase progression of Metalens #1) and $x_G$-axis of the global coordinate system G is denoted as $\psi_1$. Similarly, the angle between $x_{L2}$-axis of the local coordinate system L2 and $x_G$-axis is denoted as $\psi_2$. Changing the values of $\psi_1$ and $\psi_2$ corresponds to a physical rotation of Metalenses #1 and #2, respectively. (r, $\psi$) are the radial and angular coordinates of the focal position with respect to the global coordinate system. The relationships among the azimuth angles satisfy:

$$\psi = \frac{\psi_1 + \psi_2}{2} \tag{2}$$

$$a = \frac{|\psi_1 - \psi_2|}{2} \tag{3}$$

where $\alpha$ is the angle between the radial direction of the focus point and the $x_{L1}$-axis or $x_{L2}$-axis. Without loss of generality, here we consider the scenario that the focus of Metalens #2 steers radially along the $y_G$-axis since the 2D focus steering can be achieved by co-rotation of the metalens doublet. Metalens #2 is synthesized by considering the required phase retardation profiles for multiple focusing cases. For each focusing case, the required phase retardation profile can be computed by $$\varphi^{(i)} = \frac{2\pi}{\lambda_0}\sqrt{\left(x - r^{(i)}\cos\alpha^{(i)}\right)^2 + \left(y - r^{(i)}\sin\alpha^{(i)}\right)^2 + f_2^2} - \varphi_{inc}^{(i)} + C^{(i)}, \tag{4}$$

$$i = 1, 2, \ldots, I$$

The superscript (i) denotes the $i^{th}$ focal point of interest and I is the total considered focal points (for this device I=4). (x, y) are the positions of the dielectric posts of Metalens #2 in the local coordinate system L2. $r^{(i)}$ and $\alpha^{(i)}$ are the radial and azimuth angles of the $i^{th}$ considered focus in the coordinate system L2, respectively. $\varphi_{inc}^{(i)}$ is the incident phase of Metalens #2, and $C^{(i)}$ is a reference phase which is a phase constant added to all the pixels on the aperture of Metalens #2. It is worth stressing that the phase constant for different focal positions can be different and can be optimized to minimize the aperture phase errors among all the considered foci. Since the titled plane wave from Metalens #1 is the incident field of Metalens #2, $\varphi_{inc}^{(i)}$ can be calculated by $$\varphi_{inc}^{(i)} = \frac{2\pi}{\lambda_0}\sin\theta_{inc}^{(i)}\left(x\cos\phi_{inc}^{(i)} + y\sin\phi_{inc}^{(i)}\right) \tag{5}$$

where $(\theta_{inc}^{(i)}, \phi_{inc}^{(i)})$ is the direction of the incident wave in terms of the coordinate system $L_2$ for the $i^{th}$ focusing case. From (4) and (5), one can observe that once the considered physical rotation angles (or $\alpha$) of Metalens #2 is chosen, the positions of all the pixels and the angles of the incident aperture phase distribution are fixed and the desired compensation phase only depends on $r^{(i)}$ and $C^{(i)}$. The known quantity of (4) and (5) for the considered four focusing cases are listed in Table III:

TABLE III

Known parameters and the optimized radials and reference phases of the four focusing cases.

| Case | $\alpha^{(i)}$ | $f_2$ | $\theta_{inc}^{(i)}$ | $\phi_{inc}^{(i)}$ | $r^{(i)}$ | $C^{(i)}$ |
|---|---|---|---|---|---|---|
| 1 | 90° | 20 mm | 20° | 0° | 0 mm | 0° |
| 2 | 67.5° | 20 mm | 20° | 45° | 5.17 mm | 335.3° |
| 3 | 45° | 20 mm | 20° | 90° | 10.36 mm | 294.5° |
| 4 | 0° | 20 mm | 20° | 180° | 15.78 mm | 252.2° |

Different focusing cases use different aperture phase distributions for Metalens #2 and it is impractical to satisfy all the desired phase distributions for all the pixels on the aperture. In order to eliminate the aberration of Metalens #2 as shown in FIG. 13(*f*), a multi-focus design method may be used to achieve a smaller phase variation for different required phase distributions with different focusing cases by optimizing $r^{(i)}$ and $C^{(i)}$. Moreover, pixels are illuminated by different incident intensities and those with larger illumination intensities have larger contributions to the near-field focusing. Therefore, priority may be given to reduce the phase variation of those elements with large illumination intensities. A fitness function targeting the total phase variance of the whole metalens aperture is thus constructed, which can be mathematically written as $$\mathrm{cost}(\vec{r}, \vec{C}) = \sum_{m=1}^{M}\sum_{n=1}^{N} w_{mn}\mathrm{Var}(\vec{\varphi}_{mn}) \tag{6}$$

where $w_{mn}$ is a weighting factor related to the illumination intensity of the $mn^{th}$ dielectric post of Metalens #2, which is practically obtained by extracting the incident amplitude distribution on the plane of Metalens #2. $\mathrm{Var}(\vec{\varphi}_{mn})$ is the variance of the required transmission phase vector ($\vec{\varphi}_{mn}$= $(\varphi_{mn}^{(1)}, \varphi_{mn}^{(2)}, \ldots, \varphi_{mn}^{(I)})$. The required transmission phase depends on radii of the foci $\vec{r}=(r^{(1)}, r^{(2)}, \ldots, r^{(I)})$ and reference phases $\vec{C}=(C^{(1)}, C^{(2)}, \ldots, C^{(I)})$. Hence, the variables $\vec{r}$ and $\vec{C}$ can be optimized to minimize the objective function in (6). In practice, $r^{(1)}$=0 mm and $C^{(1)}$=0° are chosen to ensure that the focus is at the center when $\alpha$=90° and provide a reference aperture phase distribution to other focusing cases. Considering the complexity and nonconvexity of the optimization problem, particle swarm optimization (PSO) is adopted to find the global minima and speed up the process. The optimized results of $\vec{r}$ and $\vec{C}$ are listed in Table III. The synthesized transmission phase profile of Metalens #2 is the mean of the four desired phase distributions and the result is plotted in FIG. 13(*h*).

Details on the PSO for Metalens #2 design

As discussed above, the PSO is used to optimize the radius of the focus r and reference phase C for each focusing case. PSO is a robust and powerful optimization arithmetic to approach global minima. To implement PSO, an initial set of random positions and velocities are defined for the particles in the swarm. The particles fly through the N-dimension problem space subject to both deterministic and stochastic update rules to new positions as follows:

$$v_n = w \times v_n + c_1 \times \text{rand}(\ ) \times (p_{local\ best} - x_n) + c_2 \times \text{rand}(\ ) \times (p_{global\ best} - x_n)$$

$$x_n = x_n + v_n$$

where $v_n$ and $x_n$ are the velocity and position of the particle in the $n^{th}$ dimension, respectively. $c_1$ and $c_2$ are the self- and group-knowledge constants, which determine the relative pull, and w is the inertial weight. For this optimization problem, the radius and reference phase are set as the positions for the particles in the swarm. Meanwhile, $r^{(1)}=0$ mm and $C^{(1)}=0°$ are chosen to ensure that the focus is at the center when α=90° and provide a reference aperture phase distribution to other focusing cases. The swarm population was set to 20 particles and 1000 iterations. The inertial weight w was varied linearly from 0.9 to 0.4, and the self-knowledge and group-knowledge constants, $c_1$ and $c_2$ were set equal to 2. The fitness function of this optimization is to minimize the total phase variance of the whole metalens aperture. The swarm of particles explores the problem hyperspace and eventually settles down to the optimum solution.

Figures 16A, 16B, 16C, 16D, 16E:
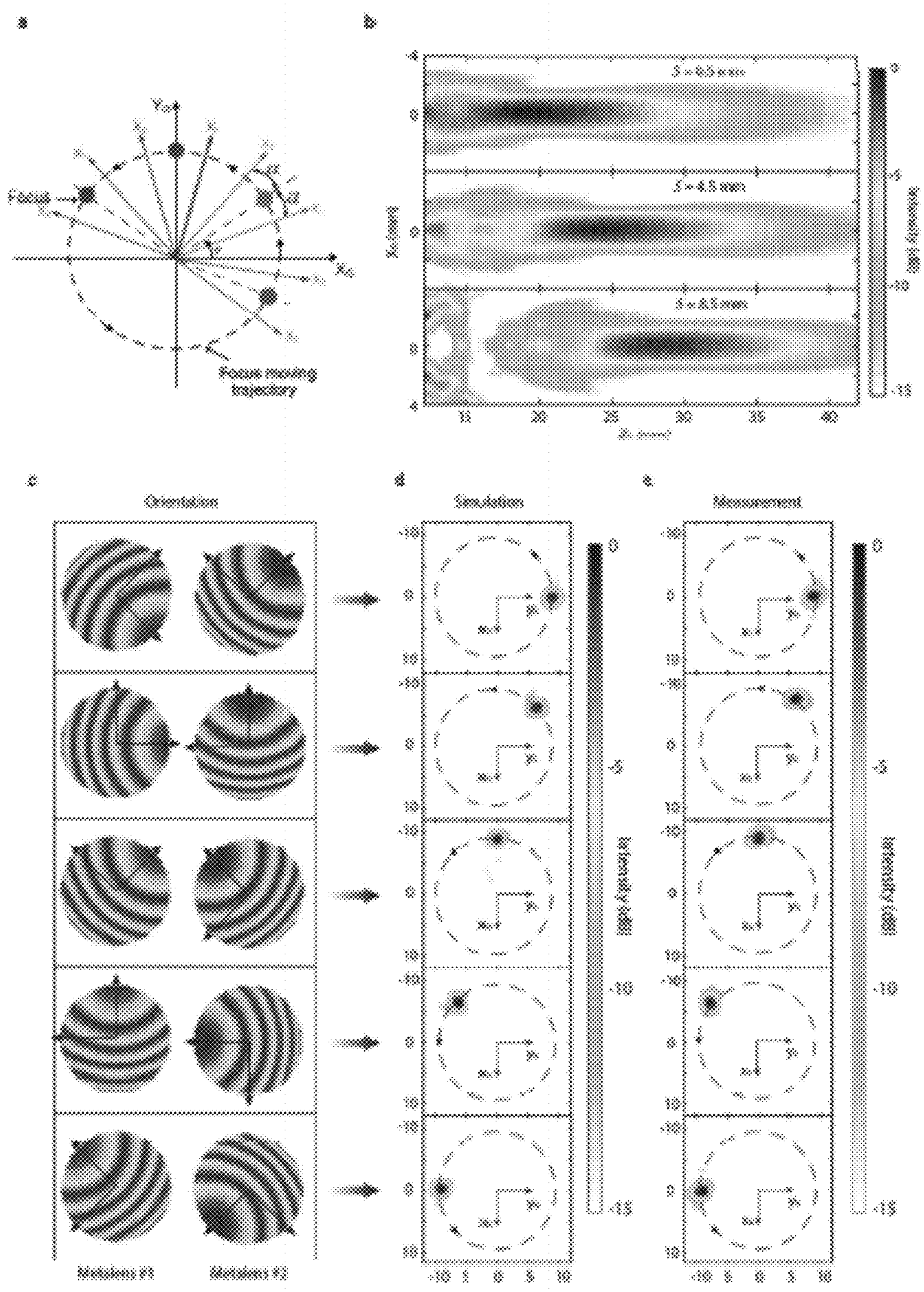
FIGS. 16(*a*)-16(*e*) depict simulated and measured power densities for a metalens system of the present invention in azimuthal steering.

Focus radial steering: To steer the focus along the radial direction, the metalens pair is synchronously counter rotated. In other words, the metalens pair is turned in the opposite direction by the same angle α while keeping their sum (or ψ) constant. FIG. 16(*a*) shows the three defined coordinate systems and their geometric relationships for focus radial steering by synchronous counter rotation of the metalens doublet. Two extremes are firstly considered. When the phase progressions of the two metalenses are in the oppose direction (i.e., α=90° as denoted by the $x_{L1}$- and and $x_{L2}$-axes in FIG. 16(*a*)), the focal point will be at the origin. When the phase progressions of the two metalenses are aligned in the same direction (i.e., α=0° as indicated by the $x_{L1}$- and $x_{L2}$-axes in FIG. 16(*a*)), maximum focus steering occurs. As a result, by reducing the value of α from 90° to 0° (i.e., anticlockwise rotating Metalens #1 and clockwise rotating Metalens #2 by the same angle α), the focus can be tuned radially in the focal plane. In order to verify its radial focus-steering capability, the synthesized metalens doublet was modeled and simulated in a full-wave electromagnetic simulator Ansys HFSS. Without loss of generality, the metalens pair is in-plane rotated to scan its focus along the $y_G$-axis of the global coordinate system (i.e., ψ=90°). FIG. 16(*c*), (*d*) plots the orientations of the metalens pair and their corresponding simulated power densities on the focal plane when α=90°, 67.5°, 45°, and 0°, respectively. The positions of the foci and their corresponding rotation angles are listed in Table IV.

TABLE IV

Focal positions and rotation angles for metalens focus radial steering.

| Case | $\psi_1$ | $\psi_2$ | α | ψ | r |
|---|---|---|---|---|---|
| 1 | 0° | 180° | 90° | 90° | 0 mm |
| 2 | 22.5° | 157.5° | 67.5° | 90° | 4.6 mm |
| 3 | 45° | 135° | 45° | 90° | 8.9 mm |
| 4 | 90° | 90° | 0° | 90° | 13.4 mm |

From FIG. 16(*d*), it can be clearly seen that a radially steerable focal radius from 0 to 13.4 mm can be achieved by synchronous counter rotation of the metalens doublet. Note that although only four rotation angles are presented in FIG. 16 (*c*), (*d*), the focus can actually continuously steer along the radial direction by continuous, synchronous rotation of the metalens doublet. FIG. 16(*b*) shows the simulated power densities on the focal plane of the metalens pair. The full width at half maximum (FWHM) of the focal point at the origin is around 1.5 mm and increases to 3 mm when scans to the edge which is attributed to the reduced projected aperture of the metalens. Within the whole focus steering range, the near-field sidelobe levels (SLLs) are all below −14 dB as shown in FIG. 16(*b*). Meanwhile, the focus scan loss, defined as the discrepancy of electric field intensity at the focal point when scanning, is around 4.5 dB.

Figures 18A, 18B, 18C, 18D:
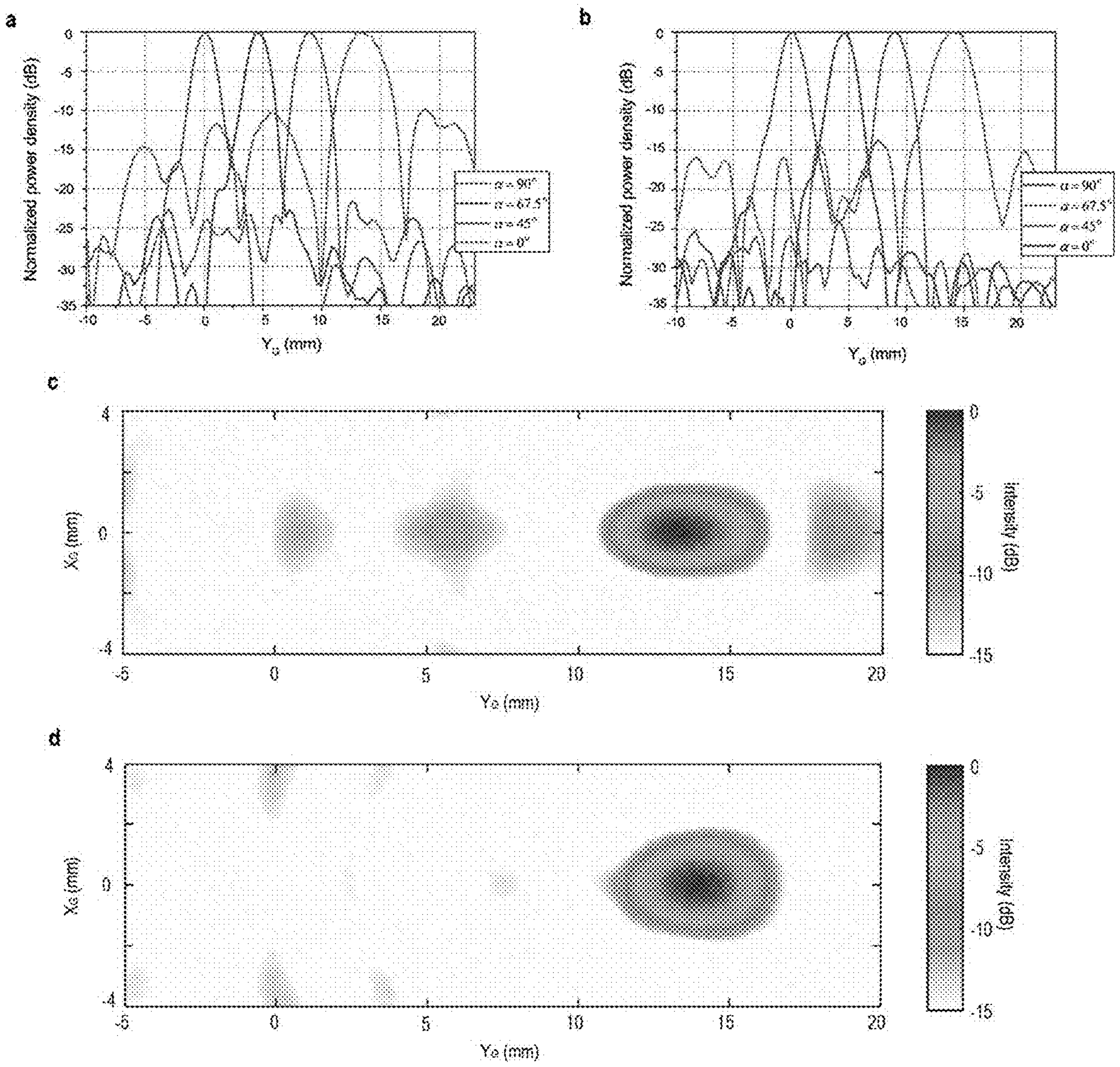
FIGS. 18(*a*)-18(*d*) show focus-steering performance comparison for single-focus and multi-focus metalenses for focus radial scanning.

To demonstrate the advantages of the multi-focus Metalens #2 design compared to the single-focus metalens, metalens pairs using two different Metalenses #2 were modelled and simulated in Ansys HFSS. Simulated results showing superior focus-steering performances in terms of near-field SLLs and scan loss in the whole scan range are obtained for our multi-focus Metalens #2 (for details of the focus-steering performance improvement, see FIGS. 18(*a*)-18(*d*)).

Figures 15A, 15B, 15C, 15D, 15E:
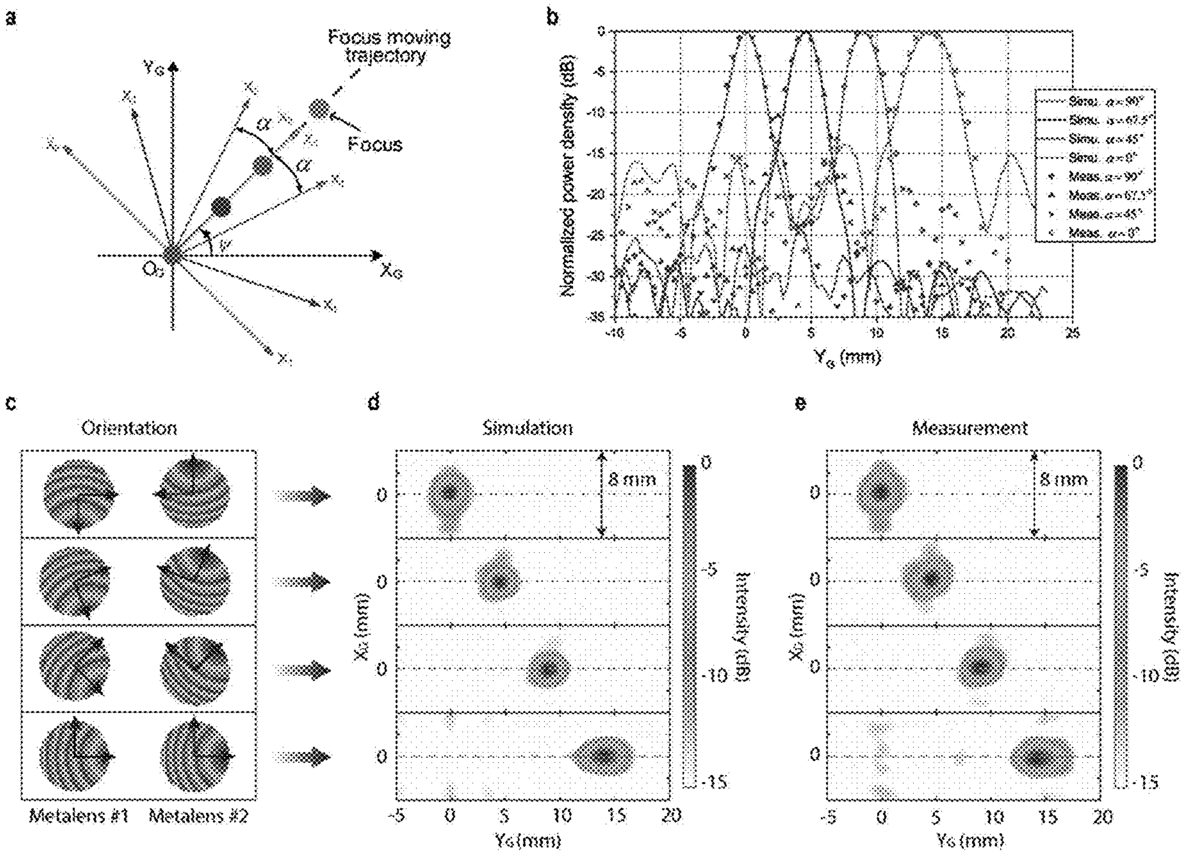
FIGS. 15(*a*)-15(*e*) depict simulated and measured power densities for a metalens system of the present invention in radial steering.

Focus azimuthal steering: When the metalens doublet is synchronously co-rotated, i.e., the metalens doublet is rotated in the same direction by the same angle, the focus will steer azimuthally on the focal plane. FIG. 15(*a*) shows the three defined coordinate systems and their geometric relationships for focus azimuthal steering by synchronous co-rotation of the metalens doublet. Increasing the sum of the rotation angles (or ψ) of the metalens pair while keeping their difference (or α) constant, the focal point will steer anticlockwise with the same radius. FIG. 15(*c*), (*d*) illustrate the orientations of the metalens doublet and their corresponding simulated power densities on the focal plane with the same α=45° but with different ψ (ψ=90°, 135°, 180°, 225° and 270°, respectively). The focus positions and their corresponding rotation angles are listed in Table V.

TABLE V

Focal positions and rotation angles for metalens focus azimuth steering.

| Case | $\psi_1$ | $\psi_2$ | α | ψ | r |
|---|---|---|---|---|---|
| 1 | 45° | 135° | 45° | 90° | 8.9 mm |
| 2 | 90° | 180° | 45° | 135° | 8.9 mm |
| 3 | 135° | 225° | 45° | 180° | 8.9 mm |
| 4 | 180° | 270° | 45° | 225° | 8.9 mm |
| 5 | 225° | 315° | 45° | 270° | 8.9 mm |

The azimuthal focus steering capability of the metalens doublet is evident from FIG. 15(*d*), where the focus steers anticlockwise along a circular orbit. In addition, the focus at different azimuth angles shares a similar focusing performance in terms of near-field SLL, FWHM and power density. This is attributed to the isotropic characteristic of the employed dielectric pixel of the metalenses. Again, although only five azimuthal steering cases are presented in FIG. 15(*d*), the metalens doublet can realize continuous focus azimuthal steering with continuous synchronous co-rotation of the metalens pair.

Focus longitudinal steering: In analogy to a zoom lens of an optical camera, the metalens pair can steer its focus along the longitudinal direction ($z_G$-direction) by simply changing the separation S of the metalens doublet. For focus longitudinal steering, both the feed source and metalens #1 are kept stationary while metalens #2 is linearly translated along the $z_G$-direction. Since the incident field of metalens #2 is a plane wave, changing the distance between the two metalenses will not affect the incident phase distribution $\varphi_{inc}$ of metalens #2. From (4), it can be seen that the transmitted phase front of metalens #2 remains unchanged and hence the focus will remain stationary with respect to metalens #2 or local coordinate system L2. Nevertheless, in the view of the whole metalens or global coordinate system, the focus actually moves along the longitudinal direction. FIG. 16(*b*) shows the simulated power densities on the longitudinal plane for different separations of the metalens pair (S=0.5, 4.5, 8.5 mm, respectively). It can be clearly seen that the focus is moving away from the metalens accordingly by linear translation of Metalens #2. Of course, Metalens #2 cannot be infinitely far apart from Metalens #1 because too large a separation will reduce the energy captured by Metalens #2 and deteriorate the focusing performance Nevertheless, a relatively large longitudinal scan range of 8 mm ($8\lambda_0$) can be achieved in this design.

3D focus steering: The focus of the metalens doublet can be steered radially and azimuthally by synchronous counter rotation and co-rotation of the metalens pair, respectively. As a result, by combining these two movements, the focus can be steered at arbitrary position on the focal plane within the FoV (i.e., realize 2D focus steering). For demonstration purpose, the metalens doublet is rotated to steers its focus along a "φ"-shaped moving trajectory (i.e., along the diagonal direction and the circular trace with a radius of 4.6 mm) The simulated results are shown in FIG. 14(*b*), which is obtained by adding the simulated power densities on the focal plane for all the focus steering cases. A nice 2D focus-steering performance can be observed. Although one focus moving trajectory is presented in FIG. 14(*c*), the metalens doublet can actually steer its focus at any position on the focal plane within the FoV. Combining the in-plane rotation of the metalens doublet and linear translation of metalens #2, the metalens can realize 3D focus steering.

FIG. 14(*e*) simulates power densities on three focal planes (S=0.5, 4.5 and 8.5 mm) by combing synchronous co-rotation and counter rotation of the metalens doublet and linear translation of metalens #2. For each plane, the focus of the metalens doublet is steered along the lines of $x_G$-axis, diagonal, and $y_G$-axis. Again, although focusing scanning on only three lateral planes are shown in FIG. 14(*e*) for simplicity, the metalens doublet can steer its focus at any position in the cylindrical 3D space with a diameter of ~27 mm and length of 8 mm

Example 2: Fabrication and Experimental Verification

Based on the above design a prototype of the 3D focus-steering all-dielectric terahertz metalens was fabricated. 3D printing technology was used to manufacture the two dielectric metasurfaces aiming at simplifying the fabrication process and reduce the cost. FIG. 14(*a*) shows the photograph of the 3D printed terahertz metalenses. A good profile of the 3D printed metalens is observed. Holes at an angular spacing of 22.5° on the periphery of the metalenses are used for alignment and assembly purpose. A terahertz planar near-field scanning measurement setup was built to measure the performance of the 3D printed focus-steering metalens. A pair of frequency extenders (OML V03VNA2-T/R) is used to extend the operating frequency of the vector network analyzer (Agilent N5245A) up to 220-325 GHz. A pair of DC power sources is utilized as the power supply for the two OML extenders. One extender on a 3-axis translational stage is used to measure the field from the receiving probe, while another one is connected to the device under test (DUT). A piece of absorber (Eccosorb LS-30) is placed on the front metallic surface of each of the two extenders to suppress possible multiple reflections. The extenders and translational stage are placed on an optical table with vibration control (Newport S-2000 Stabilizer).

Figures 19A, 19B, 19C:
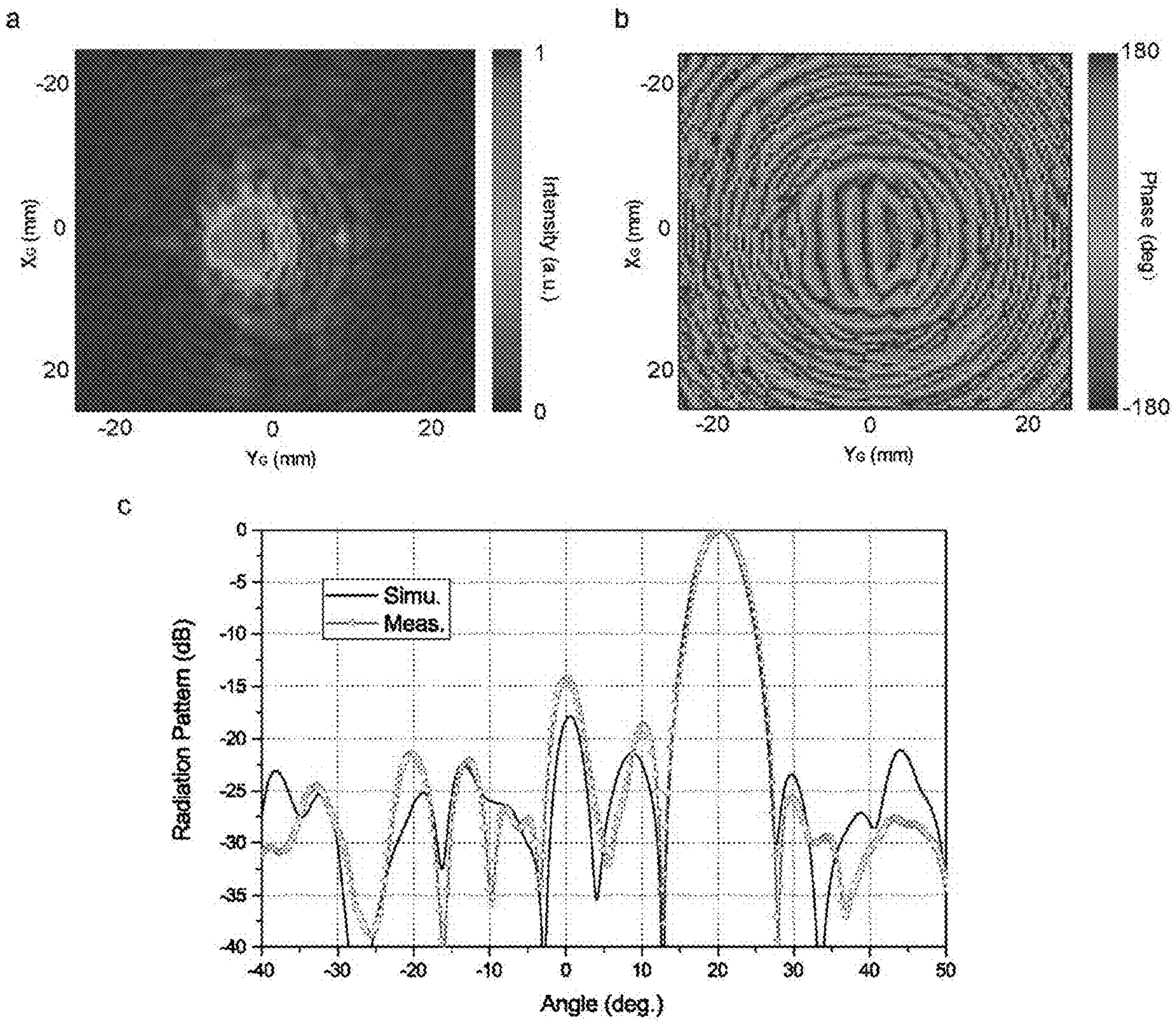
FIGS. 19(*a*)-19(*c*) show the measured near-field amplitude and phase distribution and the far field radiation pattern of metalens #1.

The radiation performance of Metalens #1 is measured. The feed horn is vertically polarized with the electric field parallel to the $y_G$-axis. For this demonstration, only Metalens #1 is placed in front of the feed horn with $\varphi_1$=0°. The near-field magnitude and phase of the vertically polarized field component over the scanning plane at 0.3 THz (see FIGS. 19(*a*), 19(*b*)) is measured. Then the far-field radiation pattern of Metalens #1 can be obtained from the measured near-field data using fast Fourier transformation (FFT) and the result is plotted in FIG. 19(*c*). A good agreement between the measured and simulated radiation patterns can be observed. Then Metalens #2 is put in front of Metalens #1 to realize near-field focus scanning. In this device, the separation between the metalens pair is controlled by the 3D printed dielectric posts with different heights and the metalens doublet is actuated manually for testing; however, electrical actuation using commercially available rotary motors is used for the final product to enable rapid scanning. For each near-field focusing case, the probe is put at the focal plane to record the radiating vertically polarized field component of the metalenses. FIGS. 15(*e*), 16(*e*) show the measured near-field power densities when S=0.5 mm and the metalens doublet is rotated to steer the focus radially (along $y_G$-axis) and azimuthally (with radius r=8.9 mm), respectively. The measured near-field power densities along the line $x_G$=0 mm on the focal plane are shown in FIG. 15(*b*), and the measured results agree well with the simulated ones. The focus steering feasibility is evident from FIGS. 15(*e*), 16(*e*) where clear measured focus radially and azimuthally steering trajectories can be observed.

To demonstrate its 3D focus-steering feasibility, the metalens doublet is physically rotated to steer the focus along the horizontal, diagonal and vertical directions on three different focal planes (S=0.5, 4.5 and 8.5 mm) For each focusing case, we use the probe to measure the near-field power density on the focal plane. The measured 3D near-field focus-steering performance on the three focal planes is plotted in FIG. 14(*e*). As in FIG. 14(*c*), the measured results in FIG. 14(*f*), are obtained by adding the measured power densities for all the focus steering cases on each focal plane. Again, a good agreement between the measured and simulated results can be observed from FIG. 14(*d*), (*e*). All these results demonstrate the 3D focus-steering capability of the metalens system.

INDUSTRIAL APPLICABILITY

The above implementation of the invention can realize fast 3D near-field focus beam scanning upon counter rotation, co-rotation of the lens pair and a linear movement of the upper lens. Electromagnetic imaging, sensing, detection and radar systems can use the present near-field focusing antennas with fast-steering capability. The compact, low-loss and fast-steering characteristics of the 3D focus-steering terahertz lens antenna make it suitable for widespread applications including non-destructive detection, security, biology/medical sciences, and fast 3D imaging. The invention can be used in, e.g., airports/train stations/subways body security checks, RFID systems, terahertz food inspection and quality control, biology and medical sciences. In particular, the present invention may find use in applications that require a wide field of view; a field of view of 80°=80° can be achieved in one implementation of the invention, which significantly outperforms existing designs with a limited field of view of 1.1°=1.1°.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. A three-dimensional near-field focus-steering antenna for GHz or THz frequencies comprising:

first and second rotatable discrete dielectric metalenses, each metalens including arrays of subwavelength dielectric projections, the discrete dielectric metalenses being counter-rotatable and co-rotatable to change a radial and azimuthal focal position, respectively, the first and second discrete dielectric metalenses being arranged along a z-axis;

a feed source emitting radiation incident on the first discrete dielectric metalens;

a z-axis translator configured to change the relative inter-lens position of the first and second discrete dielectric metalenses to move a position of a focused beam along the z-axis;

the position of the focused beam being scannable within a three-dimensional cylindrical space.

2. The three-dimensional near-field focus-steering antenna of claim 1, wherein the dielectric projections have a parallelepiped shape.

3. The three-dimensional near-field focus-steering antenna of claim 1, wherein the dielectric projections have a hexagonal cross-sectional shape.

4. The three-dimensional near-field focus-steering antenna of claim 1, wherein the feed source includes a feed horn.

5. The three-dimensional near-field focus-steering antenna of claim 1, wherein the dielectric projections have different lengths for phase control or compensation.

6. The three-dimensional near-field focus-steering antenna of claim 1, wherein the dielectric projections include multiple subarrays, each of the sub-arrays including multiple dielectric projections of decreasing lengths.

7. An antenna device for GHz or THz frequencies comprising:

a phase control structure arranged to process a signal received from a feed source and to provide an output signal at near-field; and a movement mechanism operably connected with the phase control structure to move at least part of the phase control structure so as to steer and/or focus the output signal, the position of the output signal being scannable within a three-dimensional cylindrical space.

8. The antenna device of claim 7, wherein the phase control structure comprises a lens arrangement including, at least, a first lens and a second lens; and wherein the movement mechanism is arranged to move the first lens relative to the second lens to steer and/or focus the output signal.

9. The antenna device of claim 8, wherein the first lens and the second lens are spaced apart along an axis, and are aligned co-axially.

10. The antenna device of claim 9, wherein the movement mechanism is arranged to rotate the first lens relative to the second lens about the axis, by rotating either one or both of the first and second lens about the axis, clockwise or counterclockwise, to steer the output signal radially and azimuthally on a focal plane; and wherein the movement mechanism is arranged to translate the first lens relative to the second lens along the axis, by translating either one or both of the first and second lens along the axis, towards or away from each other, to move the output signal longitudinally.

11. The antenna device of claim 10, wherein the movement mechanism is arranged to simultaneously rotate the first lens relative to the second lens and to translate the first lens relative to the second lens.

12. The antenna device of claim 8, wherein the first lens and the second lens are metalenses with metasurfaces.

13. The antenna device of claim 12, wherein each of the metalenses include an array of dielectric elements.

14. The antenna device of claim 13, wherein the array of dielectric elements is an array of subwavelength dielectric elements having different lengths for phase control or compensation.

15. The antenna device of claim 14, wherein the array of dielectric elements is an array of subwavelength dielectric elements includes multiple subarrays, each of the sub-arrays includes multiple dielectric elements of gradually decreasing lengths.

16. The antenna device of claim 13, wherein the first lens and the second lens are made of a dielectric resin and the array of dielectric elements are additively manufactured.

17. The antenna device of claim 7, further comprising a feed source.

18. The antenna device of claim 17, wherein the feed source comprises a feed horn.

19. The antenna device of claim 18, wherein the feed horn is operably connected to a waveguide.

* * * * *